(12) United States Patent
Franco

(10) Patent No.: US 12,051,961 B2
(45) Date of Patent: Jul. 30, 2024

(54) ASSEMBLY FOR A MOTOR VEHICLE BLOWER

(71) Applicant: Valeo Systemes Thermiques, Le Mesnil-Saint-Denis (FR)

(72) Inventor: Ismaël Franco, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 602 days.

(21) Appl. No.: 17/285,332

(22) PCT Filed: Oct. 16, 2019

(86) PCT No.: PCT/FR2019/052450
§ 371 (c)(1),
(2) Date: Apr. 14, 2021

(87) PCT Pub. No.: WO2020/079365
PCT Pub. Date: Apr. 23, 2020

(65) Prior Publication Data
US 2021/0384795 A1   Dec. 9, 2021

(30) Foreign Application Priority Data
Oct. 17, 2018 (FR) ...................................... 1871203

(51) Int. Cl.
*H02K 5/14* (2006.01)
*B60H 1/00* (2006.01)
(Continued)

(52) U.S. Cl.
CPC ............. *H02K 5/146* (2013.01); *F04D 25/06* (2013.01); *H01R 39/381* (2013.01); *B60H 1/00457* (2013.01)

(58) Field of Classification Search
CPC ...... H01R 39/381; H02K 5/146; H02K 5/145; H02K 13/10; B60H 1/00457
(Continued)

(56) References Cited

U.S. PATENT DOCUMENTS 3,532,914 A * 10/1970 Chang .................... H02K 11/23
310/68 E
3,590,299 A * 6/1971 Wiggs .................. H01R 39/381
310/248
(Continued)

FOREIGN PATENT DOCUMENTS

DE        8406468 U1    5/1984
DE        9112104 U1    1/1993
(Continued)

OTHER PUBLICATIONS

International Search Report and Written Opinion in corresponding International Application No. PCT/FR2019/052450, mailed Feb. 10, 2020 (11 pages).
(Continued)

*Primary Examiner* — Edelmira Bosques
*Assistant Examiner* — Frances F. Hamilton
(74) *Attorney, Agent, or Firm* — Osha Bergman Watanabe & Burton LLP

(57) ABSTRACT

The invention relates to an assembly for an electric motor, comprising a motor support (2), a brush (5) and a device for moving (7, 10) the brush (5), the device comprising an arm (7) rigidly connected to the brush (5) and a pivot connector (10) between the support (2) and the arm (7), characterised in that the pivot connector (10) is made from an elastomeric material so as to exert a restoring force on the arm (7).

9 Claims, 5 Drawing Sheets

(51) Int. Cl.
*F04D 25/06* (2006.01)
*H01R 39/38* (2006.01)

(58) Field of Classification Search
USPC .......................................................... 454/201
See application file for complete search history.

(56) References Cited

U.S. PATENT DOCUMENTS

| | | | | | |
|---|---|---|---|---|---|
| 3,919,574 | A | * | 11/1975 | Schmuck | H02K 5/10 |
| | | | | | 310/239 |
| 4,785,214 | A | * | 11/1988 | Mummert | H01R 39/381 |
| | | | | | 310/239 |
| 6,628,036 | B1 | * | 9/2003 | Lynch | H01R 39/383 |
| | | | | | 310/239 |
| 7,466,056 | B2 | * | 12/2008 | Golab | H01R 39/385 |
| | | | | | 310/245 |
| 2009/0072656 | A1 | * | 3/2009 | Eisert | H01R 39/385 |
| | | | | | 310/244 |
| 2016/0072356 | A1 | * | 3/2016 | Li | H02K 5/146 |
| | | | | | 310/245 |
| 2018/0069448 | A1 | * | 3/2018 | Hirabayashi | H01R 39/381 |

FOREIGN PATENT DOCUMENTS

| | | | | | |
|---|---|---|---|---|---|
| DE | | 10054556 | A1 * | 5/2002 | ......... B60H 1/00521 |
| DE | 202005008840 | U1 | | 10/2006 | |
| DE | 202005008840 | U1 | * | 11/2006 | ........... H01R 39/381 |
| JP | | S47-25807 | U | 11/1972 | |
| JP | | S472807 | U * | 11/1972 | |
| JP | | 59050750 | A * | 3/1984 | ............. H02K 5/145 |
| WO | WO-2004023609 | A1 | * | 3/2004 | ........... H01R 39/381 |

OTHER PUBLICATIONS

Office Action issued in counterpart European Application No. 19806027.9, dated Apr. 11, 2024 (8 pages).

* cited by examiner

ASSEMBLY FOR A MOTOR VEHICLE BLOWER

The invention relates to an assembly for an electric motor, in particular of a motor vehicle air blower for a motor vehicle heating, ventilation and/or air conditioning device.

It is known that such a heating, ventilation and/or air conditioning device makes it possible to regulate the temperature of an air flow intended to supply the interior of the vehicle.

The air blower, for its part, serves to make the air flow enter and circulate in the heating, ventilation and/or air conditioning device as far as outlet openings, where the air enters the vehicle interior.

The blower generally has an electric motor, in particular a brushed motor, on which a wheel is mounted so as to set the air in motion. The blower also has a motor support in which the electric motor is housed, as is the control device for the electric motor, the motor and the control device being connected to one another.

It is known to mount the brushes on arms that are able to move in translation in a radial duct between a mounting position in which the arms position the brushes away from the center of the support, and a functional position in which the brushes are pressed against the commutator disposed in the center of the support. The arms are provided with a spring, the compression of which increases as the brush moves away from the center of the support. Thus, the brushes are first of all installed in the mounting position, allowing the commutator to be inserted in the center of the support, the springs being kept compressed. Once the commutator is in place, the arms are released, the springs extend and the arms and brushes move in the radial ducts so that the brushes are disposed in the functional position.

Nevertheless, such a configuration is complicated, both in terms of its structure and in terms of its mechanism, since it is necessary to mold the radial channels, to provide springs, and to ensure that the arms slide correctly in the channels. Thus, this configuration has a complex manufacturing method, with numerous steps, and its operation may not be reliable throughout the entire life of the motor vehicle.

The aim of the invention is to at least partially remedy these drawbacks.

To this end, one subject of the invention is an assembly for an electric motor, comprising a motor support, a brush and a movement device for moving said brush, the device comprising an arm secured to the brush and a pivot connection element between the support and the arm, characterized in that the pivot connection element is made from an elastomer material so as to exert a return force on the arm.

Thus, by virtue of the present invention, assembling the blower is made much easier, since, on the one hand, the need to resort to springs in order to press the brushes against the commutator of the electric motor is obviated. On the other hand, the elastomer material makes possible other types of movement for the brushes, in particular pivoting movements, making it possible not to have to mold radial ducts.

According to another characteristic of the invention, the pivot connection element comprises an interface region that interfaces with the arm, an interface region that interfaces with the support and a narrowed region of material disposed between said interface regions.

According to another characteristic of the invention, the narrowed region has a continuous narrowing of material between the two interface regions.

According to another characteristic of the invention, the interface region that interfaces with the arm comprises a captive-retention part shaped so as to be inserted into an associated orifice of the arm, a baseplate shaped so as to bear against the arm and a part called an intermediate part between the baseplate and the narrowed region.

According to another characteristic of the invention, said intermediate part of the interface region that interfaces with the arm has a rectilinear shape converging from the baseplate to the narrowed region.

According to another characteristic of the invention, the interface region that interfaces with the support comprises a captive-retention part shaped so as to be inserted into an associated orifice of the support, a baseplate shaped so as to bear against the support and a part called an intermediate part between the baseplate and the narrowed region.

According to another characteristic of the invention, the intermediate part has a rectilinear shape converging from the baseplate to the narrowed region.

According to another characteristic of the invention, the elastomer material is a polymer with a Shore A hardness of between 70 and 90.

According to another characteristic of the invention, the pivot connection element is shaped such that, when the assembly is associated with an electric motor comprising a commutator, the return force exerted on the arm moves the arm in a direction in which it moves closer to the commutator.

According to another characteristic of the invention, the pivot connection element is overmolded or captively retained on the support and/or on the arm.

Another subject of the invention is a blower for a heating, ventilation and/or air conditioning device for a motor vehicle, comprising an electric motor provided with a commutator and with an assembly as described above, the assembly being shaped such that the brush is pressed against the commutator in an operating position of the blower.

According to another characteristic of the invention, the assembly comprises two brushes and a brush movement device associated with each brush, which devices are called first and second movement devices, each brush movement device being secured to the support by a securing part, and wherein the support has an annular shape, the securing part of the first device being diametrically opposite the securing part of the second device, and each pivot connection element being shaped so that, in a rest position, the associated arm extends along a radius of the support.

Another subject of the invention is a heating, ventilation and/or air conditioning device for a motor vehicle, comprising a blower as described above.

BRIEF DESCRIPTION OF THE DRAWINGS

Other characteristics, details and advantages of the invention will become apparent upon reading the detailed description below, and upon analyzing the appended drawings, in which.

DESCRIPTION OF EMBODIMENTS

Blower, Heating, Ventilation and/or Air Conditioning Device

One subject of the invention is an assembly for an electric motor, referenced 1 in the figures.

Figure 2:
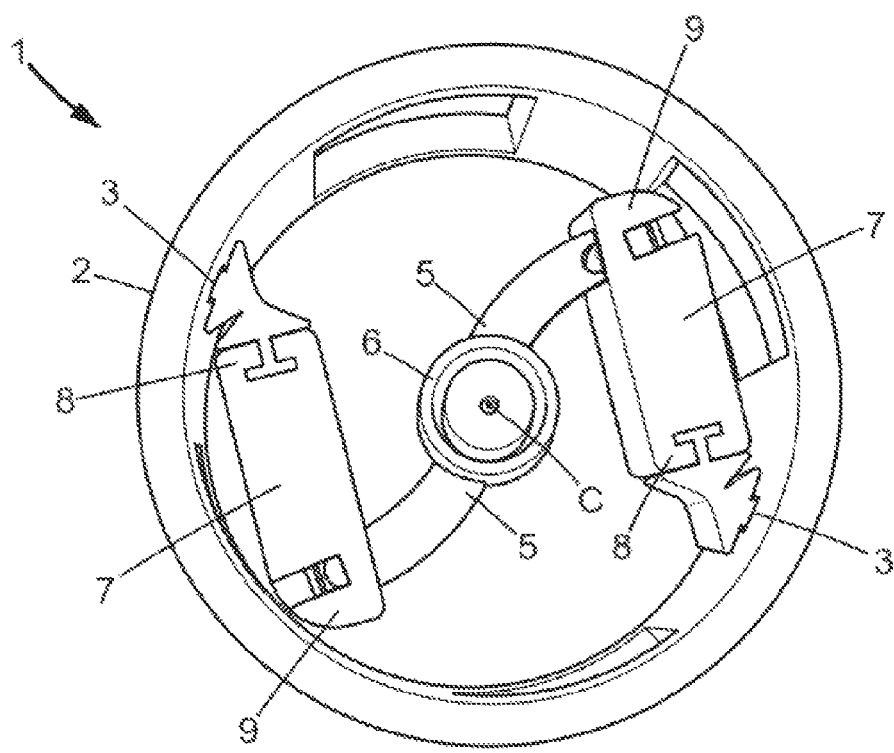
FIG. 2 a perspective view of the assembly in FIG. 1 in a second position, called the functional position.

Another subject of the invention is a blower (not illustrated) comprising the assembly 1 and an electric motor of which a commutator is illustrated in FIG. 2.

Another subject of the invention is a heating, ventilation and/or air conditioning device for a motor vehicle (not illustrated) equipped with said blower.

The heating, ventilation and/or air conditioning device makes it possible to regulate the temperature of an air flow intended for the interior of the vehicle.

The blower serves to make the air enter and circulate in the heating, ventilation and/or air conditioning system.

Assembly

Figure 1:
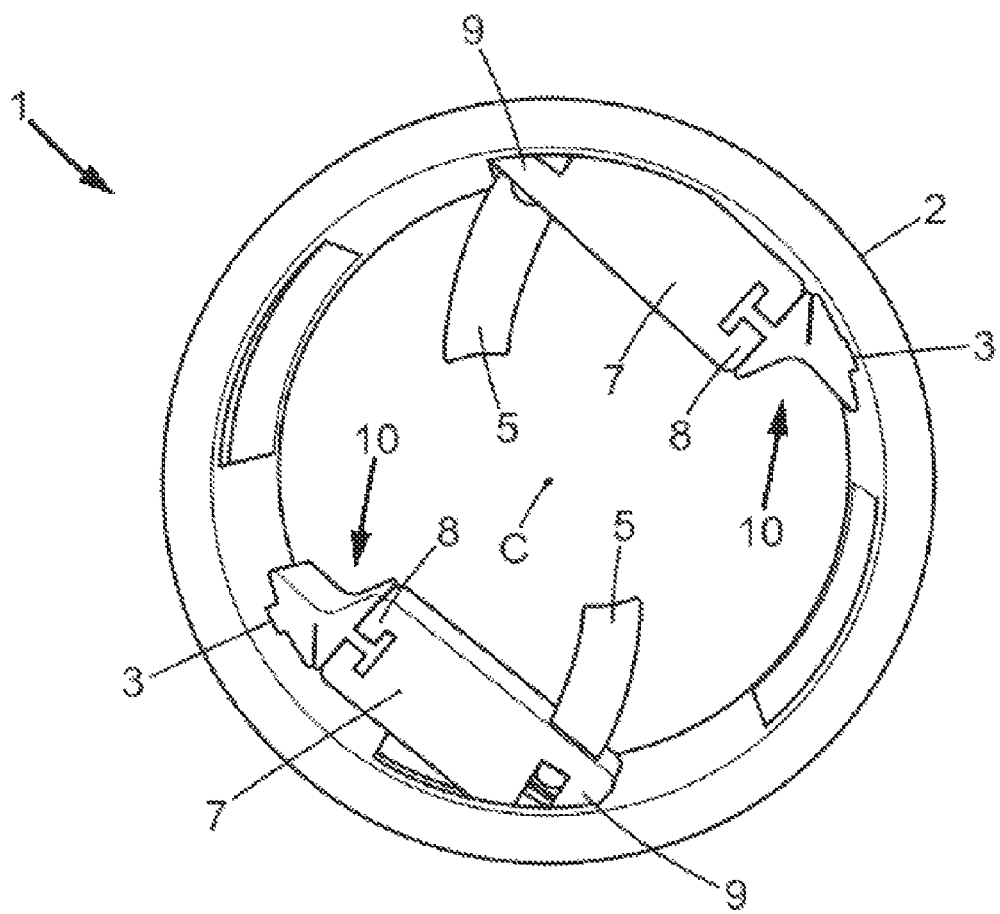
FIG. 1 illustrates a perspective view of an assembly according to the present invention in a first position, called the mounting position.

As is visible in FIGS. 1 and 2, the assembly 1 for the electric motor of the blower comprises a support 2.

In the figures, the support 2 has the overall shape of an open cylinder. Of course, the invention is not limited to this geometry.

As is particularly visible in FIG. 2, the support 2 comprises a recess 3, described in detail below.

The assembly 1 also comprises brushes 5. In the embodiment illustrated, the assembly 1 comprises two brushes. Each brush 5 is intended to be pressed against a commutator 6, visible in FIG. 2, as will be described in detail below.

The assembly 1 also comprises two arms 7, respectively associated with one of the brushes 5; i.e. each arm 7 allows the associated brush to move.

As is apparent from the figures, each arm 7 extends substantially rectilinearly in a direction L between a first end 8 and a second end 9.

The first end 8 is mounted so as to be able to move relative to the support 2. In the figures, the first end 8 comprises a pivot connection element 10 inserted into the recess 3 of the support 2.

As can be seen in FIGS. 1 and 2, each brush 5 is disposed in the vicinity of the second end 9 of the associated brush. Preferably, each brush 5 extends in a direction forming an angle of between 70° and 90° with the direction L of the associated movement arm.

The pivot connection element 10 will now be described in detail.

The pivot connection element 10 is made from an elastomer material so as to exert a return force on the arm in a direction in which it moves closer to the center C of the support 2. Preferably, the elastomer material is a polymer with a Shore A hardness of between 70 and 90. The material can in particular be an elastomer formed from two polyols and two isocyanates (denoted for example by the term "HPE") and/or a copolymer of styrene, ethylene and butylene (for example the family of materials denoted by the acronym "SEBS").

The pivot connection element 10 is called flexible pivot 10 in the remainder of the description.

Figure 3:
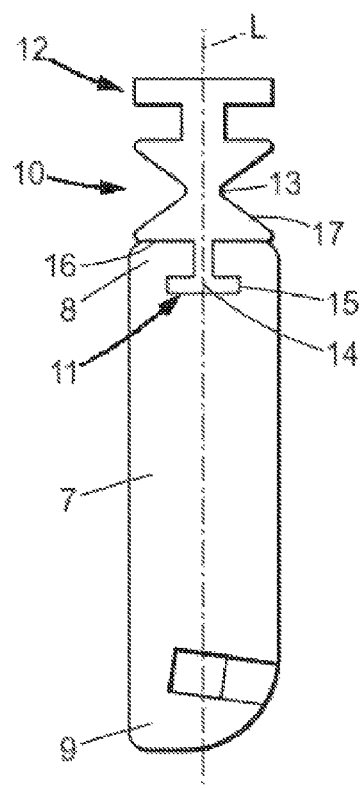
FIG. 3 illustrates a top view of an arm and a pivot connection element of the assembly in FIG. 1.
Figure 4:
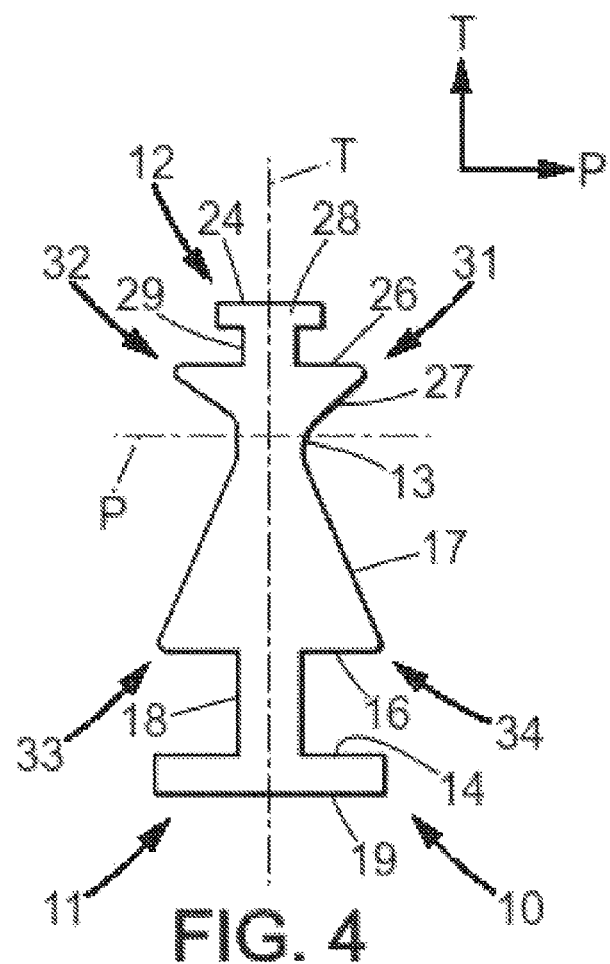
FIG. 4 illustrates a top view of the pivot connection element in FIG. 3.

As is particularly visible in FIGS. 3 and 4, the flexible pivot 10 comprises an interface region that interfaces with the associated arm 7, referenced 11 in the figures, an interface region 12 that interfaces with the support 2 and a narrowed region of material 13 between the interface regions 11 and 12, called thin region 13.

The rotational movement of the pivot 10 is made possible by virtue of the thin region 13.

In the embodiment illustrated, the thin region 13 has a continuous narrowing of material between the two interface regions 11, 12.

As is visible in FIGS. 3 and 4, the interface region 11 comprises a captive-retention part 14 shaped so as to be inserted into an associated complementary orifice 15 of the arm 7, a baseplate 16 shaped so as to bear against the end 8 of the arm 7 and a part 17 called an intermediate part between the baseplate 16 and the thin region 13.

As is particularly visible in FIG. 3, the captive-retention part 14 and the associated orifice 15 have the overall shape of the letter "T". The "T" of the captive-retention part 14 comprises a stem 18 and a base 19, the base 19 being orthogonal to the stem 18.

The baseplate 16 is a plate contiguous with the stem 18 and extending substantially orthogonal to the stem 18.

The intermediate part 17 has a rectilinear shape converging from the baseplate 16 to the thin region 13.

Similarly, the interface region 12 comprises a captive-retention part 24 shaped so as to be inserted into the recess 3 of the support 2, a baseplate 26 shaped so as to bear against the edges of the recess 3 and a part 27 called an intermediate part between the baseplate 26 and the thin region 13.

The captive-retention part 24 has the overall shape of the letter "T" provided with a stem 28 and a base 29, the base 29 being orthogonal to the stem 28.

The baseplate 26 is a plate contiguous with the stem 28 and extending substantially orthogonal to the stem 28.

The intermediate part 27 has a rectilinear shape converging from the baseplate 26 to the thin region 13.

In FIG. 4, the direction of extension of the stem 18 is coincident with the direction of extension of the stem 28. This direction is denoted T. As can be seen in FIG. 4, a longitudinal section of the flexible pivot 10 is symmetric with respect to the direction T.

As already indicated, the thin region 13 allows the pivot 10 to pivot about an axis denoted P. Preferably, the axis P is parallel to the motor shaft, when the assembly 1 is part of the blower, making it possible to guarantee surface contact between the brush and the commutator, preventing the pivot connection 10 from twisting. In FIG. 4, the axis P is orthogonal to the direction of extension T.

In FIG. 4, portions of the flexible pivot 10 that are delimited by the axis P and the direction T are denoted 31 to 34, the portion 31 of the intermediate part 27 facing the portion 34 of the intermediate part 17 and the portion 32 of the intermediate part 27 facing the portion 33 of the intermediate part 17.

The flexible pivot 10 is shaped such that, when the assembly is installed in the blower, the return force exerted on the arm moves the arm in a direction in which it moves closer to the commutator disposed in the center of the support, the portions facing each other 31, 34 and 32, 33 moving closer together or further apart.

Figure 5:
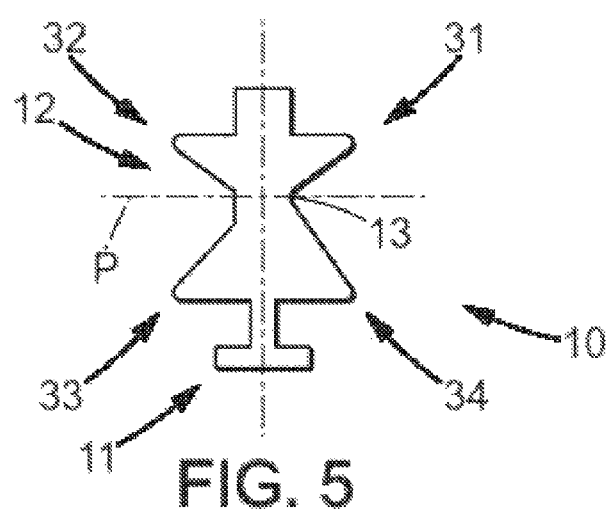
FIG. 5 illustrates a top view of the pivot connection element according to another variant embodiment.

It should be noted that according to the variant in FIG. 5, the narrowing of material between the portions 32 and 33 is greater than the narrowing of material between the portions 31 and 34. In this case, the force for moving the portions 31 and 34 closer together is different from that for the portions 32 and 33.

It should also be noted that other ways of securing the interface region to the arm and/or to the support can be envisioned. In particular, the pivot connection element 10 can be overmolded on the support 2 and/or on the arm 7.

Mounting Method

The invention is now described in relation to the method for mounting the blower starting from the assembly 1.

First of all, the assembly 1 is positioned in a mounting position, in which the arms 7 are distanced from the center C of the support. Then, the commutator 6 is inserted in the center C of the support 2, the arms being held in the mounting position. Next, the arms 7 are released. Owing to the return force of the flexible pivot connection 10, the brushes 5 move closer to the center C until they are pressed against the latter.

Resulting Advantages

As is clear from the description, the method for mounting the blower according to the present invention is made much easier by the fact that it is not necessary to mold guide ducts for the arms or to add springs. In addition, the operation of the blower is much more reliable by virtue of the elastomer pivot connection.

The invention claimed is:

1. An assembly for an electric motor, comprising:
   a motor support;
   a brush; and
   a movement device for moving the brush, the movement device comprising an arm secured to the brush and a pivot connection element between the motor support and the arm,
   wherein the pivot connection element is made from an elastomer material so as to exert a return force on the arm,
   wherein the pivot connection element comprises an interface region that interfaces with the arm, an interface region that interfaces with the motor support and a narrowed region of material disposed between both interface regions.

2. The assembly as claimed in claim 1, wherein the narrowed region has a continuous narrowing of material between the two interface regions.

3. The assembly as claimed in claim 1, wherein the interface region that interfaces with the arm comprises a captive-retention part shaped so as to be inserted into an associated orifice of the arm, a baseplate shaped so as to bear against the arm and a part called an intermediate part between the baseplate and the narrowed region.

4. The assembly as claimed in claim 1, wherein the interface region that interfaces with the motor support comprises a captive-retention part shaped so as to be inserted into an associated orifice of the motor support, a baseplate shaped so as to bear against the motor support and a part called an intermediate part between the baseplate and the narrowed region.

5. The assembly as claimed in claim 1, wherein the elastomer material is a polymer with a Shore A hardness of between 70 and 90.

6. The assembly as claimed in claim 1, wherein the pivot connection element is shaped such that, when the assembly is associated with an electric motor comprising a commutator, the return force exerted on the arm moves the arm in a direction in which it moves closer to the commutator.

7. The assembly as claimed in claim 1, wherein the pivot connection element is captively retained on the motor support and/or on the arm.

8. A blower for a heating, ventilation and/or air conditioning device for a motor vehicle, comprising:
   an electric motor provided with a commutator and an assembly, the assembly comprising:
      a motor support,
      a brush, and
      a movement device for moving the brush, comprising an arm secured to the brush and a pivot connection element between the motor support and the arm,
      wherein the pivot connection element is made from an elastomer material so as to exert a return force on the arm,
      wherein the pivot connection element comprises an interface region that interfaces with the arm, an interface region that interfaces with the motor support and a narrowed region of material disposed between both interface regions,
   the assembly being shaped such that the brush is pressed against the commutator during operation of the blower.

9. The blower as claimed in claim 8, wherein the assembly further comprises two brushes and a movement device associated with each brush, each movement device being secured to the motor support, and wherein the motor support has an annular shape, a first movement device being diametrically opposite a second movement device, and each pivot connection element being shaped so that, in a rest position, the associated arm extends along a radius of the motor support.

* * * * *